(12) United States Patent
Farooque et al.

(10) Patent No.: US 6,964,825 B2
(45) Date of Patent: Nov. 15, 2005

(54) COMPLIANT MANIFOLD GASKET

(75) Inventors: Mohammad Farooque, Danbury, CT (US); Chao-Yi Yuh, New Milford, CT (US); Dana Kelley, New Milford, CT (US); Michael Cramer, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 10/627,035

(22) Filed: Jul. 25, 2003

(65) Prior Publication Data

US 2005/0019644 A1    Jan. 27, 2005

(51) Int. Cl.$^7$ .......................... H01M 8/02; H01M 2/08; F16J 15/12
(52) U.S. Cl. ........................ 429/35; 429/37; 277/651
(58) Field of Search ............................. 429/35, 36, 37; 428/462, 493, 494, 495, 496; 277/651

(56) References Cited

U.S. PATENT DOCUMENTS

| | | | |
|---|---|---|---|
| 4,049,856 A * | 9/1977 | Adams | 428/462 X |
| 4,467,018 A | 8/1984 | Schroll | 429/18 |
| 4,774,154 A * | 9/1988 | Singelyn et al. | 429/36 |
| 4,794,055 A * | 12/1988 | Matsumura et al. | 429/35 |
| 5,154,977 A * | 10/1992 | Saito | 428/462 X |
| 5,362,074 A * | 11/1994 | Gallo et al. | 277/651 X |
| 5,687,975 A * | 11/1997 | Inciong | 277/651 X |
| 6,413,665 B1 | 7/2002 | Blanchet et al. | 429/37 |
| 6,514,636 B2 * | 2/2003 | Li et al. | 429/35 |
| 6,531,237 B2 | 3/2003 | Kelley et al. | 429/35 |
| 6,607,830 B2 * | 8/2003 | Murakami et al. | 277/651 X |
| 6,660,422 B2 * | 12/2003 | Krasij et al. | 429/35 |

\* cited by examiner

*Primary Examiner*—Stephen J. Kalafut
(74) *Attorney, Agent, or Firm*—Cowan, Liebowitz & Latman, P.C.

(57) ABSTRACT

A fuel cell gasket assembly for use in conjunction with a fuel cell stack by placing the gasket assembly between the periphery of a face of the stack and a manifold. The periphery of the stack face includes periphery portions that expand differently during operation of the stack. The gasket assembly comprises a member adapted to have different compressibilities over predetermined portions of the member and/or a resilient shim embedded in preselected sections the member whereby the gasket maintains contact with the periphery of the stack face and the manifold. The structure of the gasket assembly of the present invention provides a compliant fuel cell gasket assembly that accommodates bipolar plate growth and end cell growth in the fuel cell stack and maintains the gas seal between the stack and manifold structure.

68 Claims, 13 Drawing Sheets

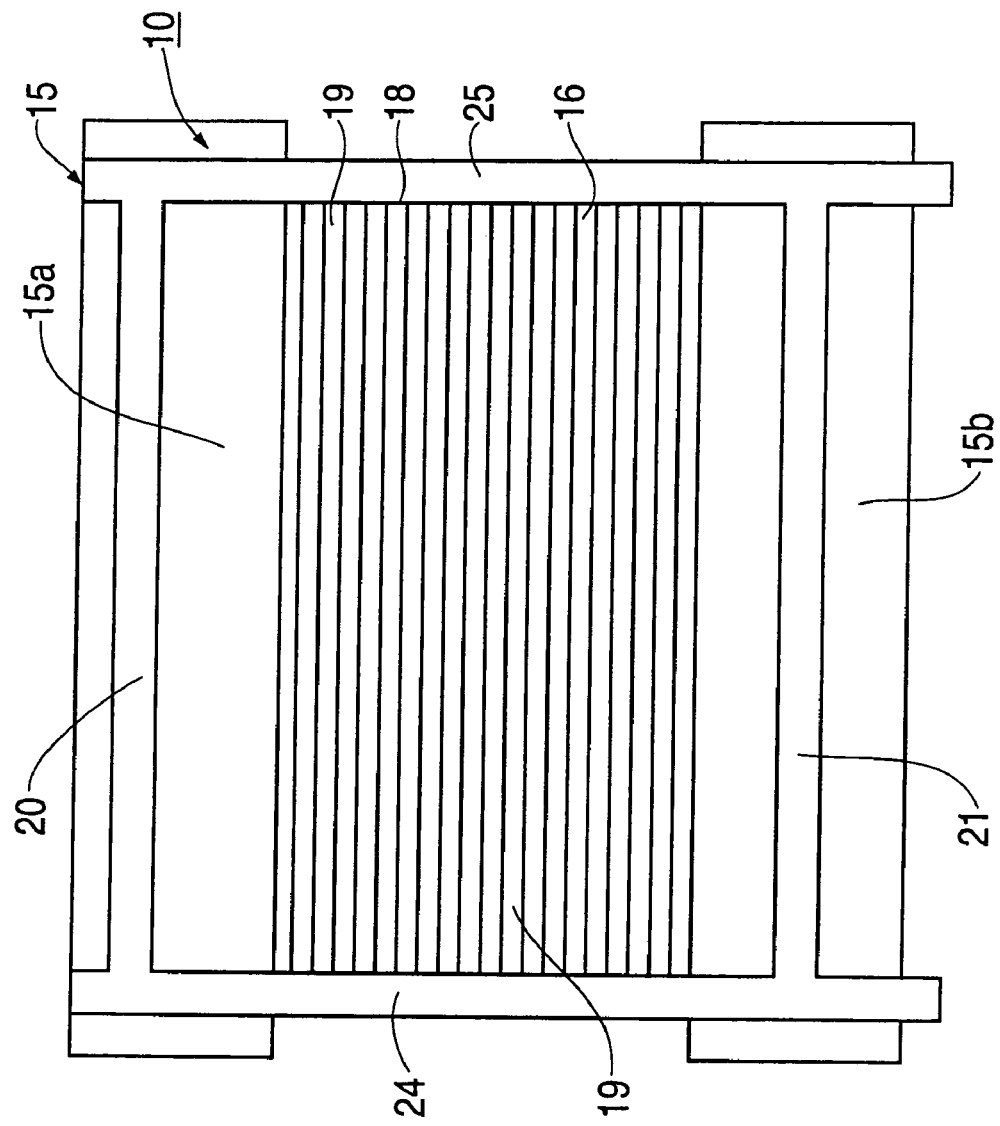

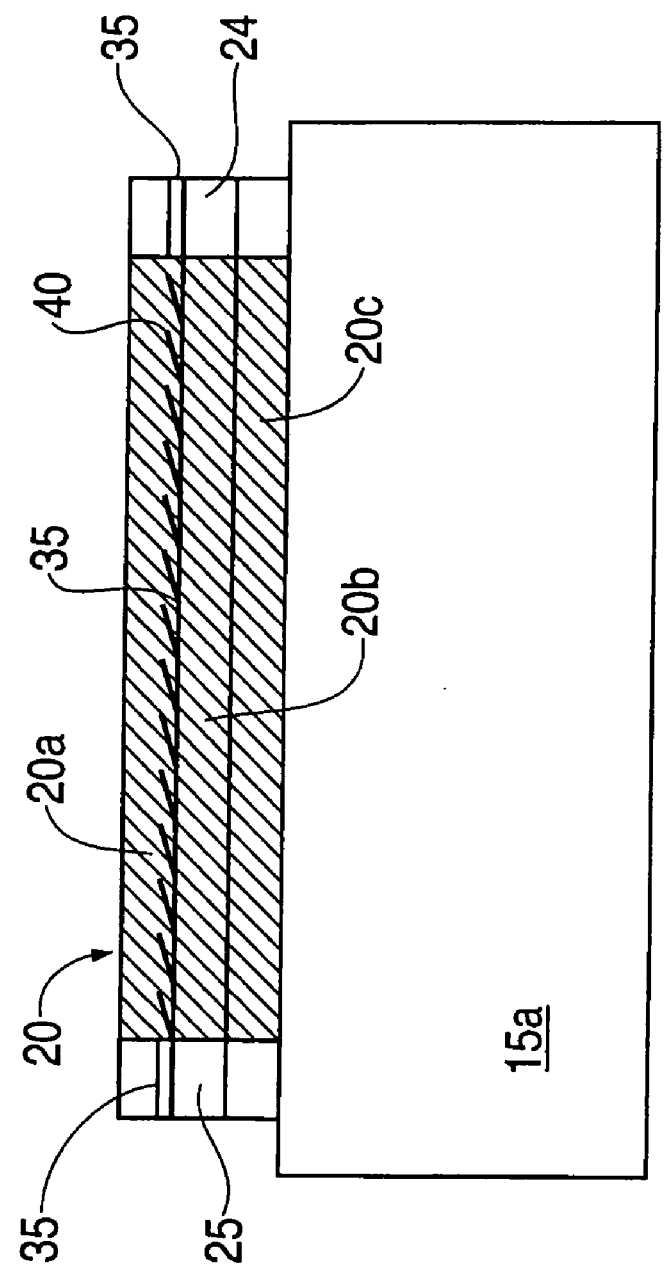

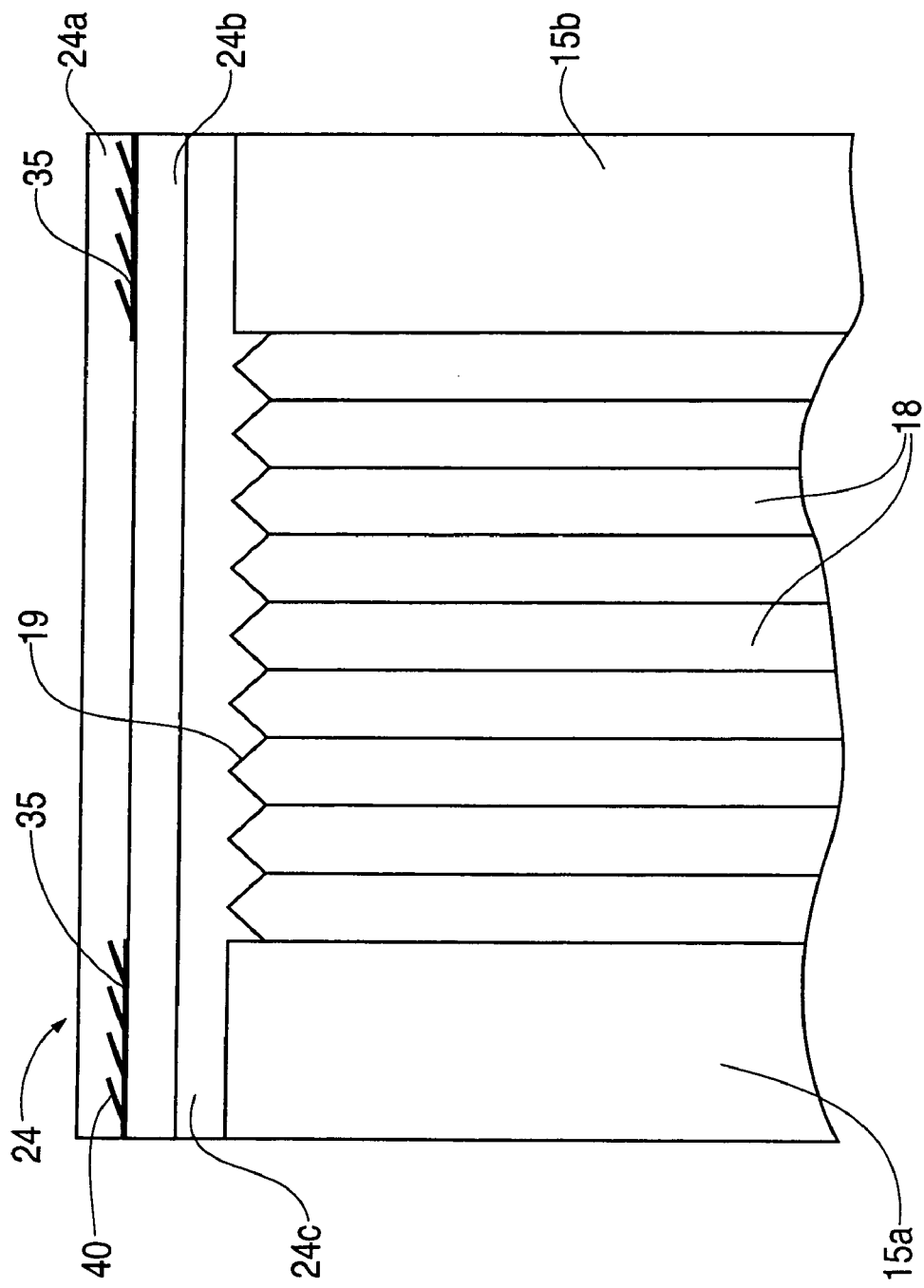

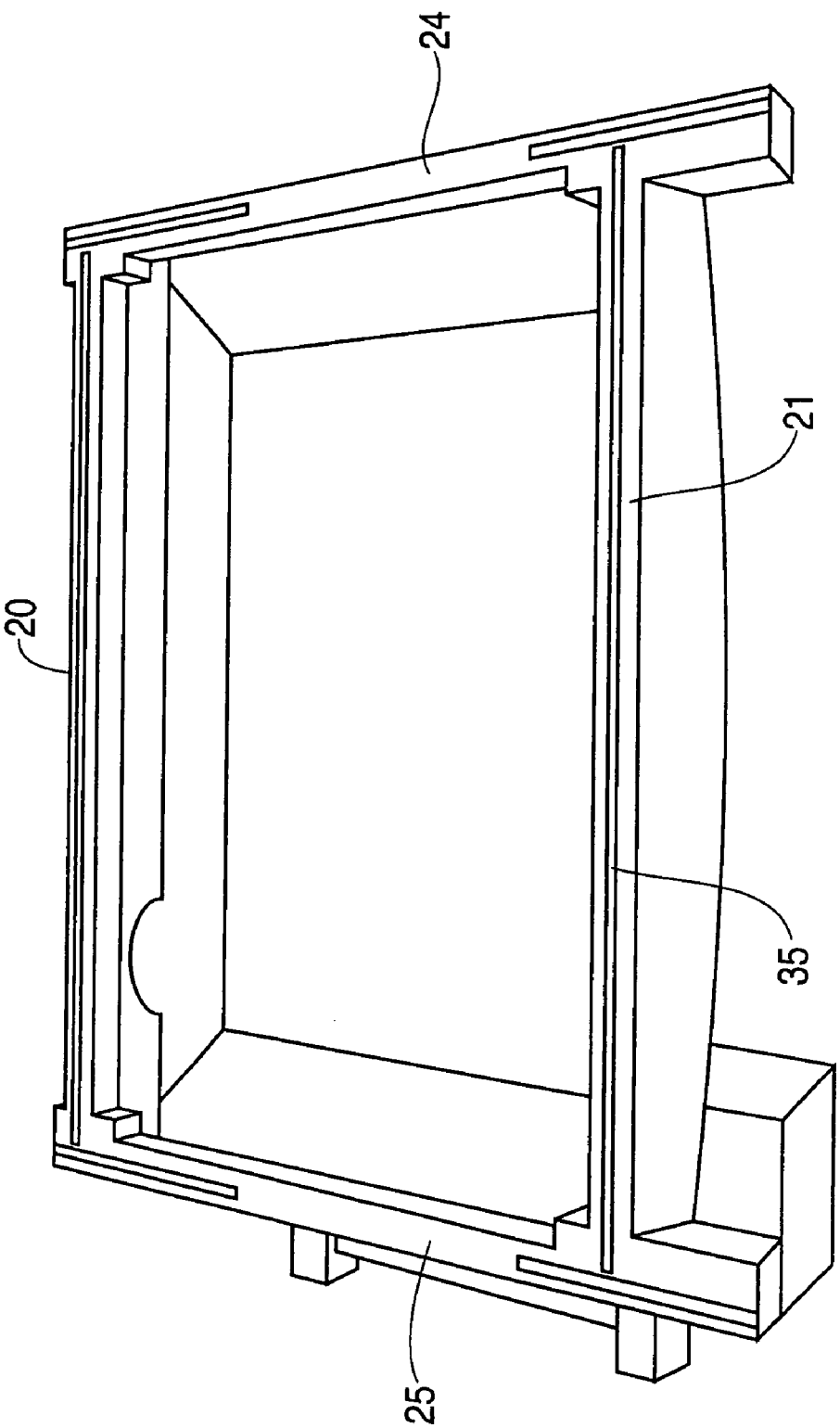

COMPLIANT MANIFOLD GASKET

BACKGROUND OF THE INVENTION

This invention relates to fuel cells and, in particular, to a sealing gasket for use between a high temperature fuel cell stack and manifold assembly. More specifically, this invention relates to a compliant gasket with an embedded resilient shim for maintaining a gas seal at the fuel cell stack end plate-bipolar plate interface.

A conventional fuel cell stack typically has several hundred fuel cells in series, forming several stack faces. In an externally manifolded stack, the fuel cells are left open on their ends and gas is delivered by way of manifolds or pans sealed to the respective faces of the fuel cell stack. Manifold assemblies are compressed against the fuel cell stack to prevent gas leaks between the manifolds and corresponding stack faces, as described in U.S. Pat. No. 6,413,665 owned by the assignee of the present application. The manifolds are also provided with a manifold gasket such as that disclosed, for example, in U.S. Pat. No. 4,467,018 to avoid gas leaks and to dielectrically isolate the fuel cell stack from the manifolds. The manifolds thus provide sealed passages for delivering fuel and oxidant gases to the fuel cells and directing the flow of such gases in the stack.

To maintain the performance of a fuel cell stack, the manifold gasket must continue to perform satisfactorily over the life of the stack. Thus, the manifold gasket must maintain its sealing effectiveness under the conditions required for operation of the fuel cell stack and for the duration of the life of the stack.

In high temperature fuel cell stacks, the aforesaid requirement that the manifold gasket retain its sealing effectiveness over the life of the stack is difficult to satisfy due to the environment of the stack which causes the dimensions of the stack and the stack components to change during long term operation. These changes are particularly evident in the bipolar plates of the stack fuel cells and the stack end plates which grow at different rates and, thus, exhibit an increasing disparity is size.

More particularly, during operation of a molten carbonate fuel cell stack, the bipolar plates of the stack grow over time due to carburization, whereby the bipolar plates absorb carbon from the carbon monoxide or carbon dioxide that is typically present in the stack fuel gas. For example, it has been found that in one type of molten carbonate fuel cell stack each bipolar plate will grow more than one tenth of an inch, or 0.21% of its total length, and more than one twentieth of an inch, or 0.19% of its total width, over an operating period of 14,500 hours. Bipolar plate growth in other types of molten carbonate fuel cell stacks is comparative depending upon the hours of operation.

The aforesaid growth of the bipolar plates in a molten carbonate fuel cell is not matched by corresponding growth of the stack end plates. This difference in growth distorts each end face of the stack. In particular, a step-like transition occurs at the interface between each end face of an end plate and the end face of the bipolar plates of the adjacent end cell. Also, in the center of the stack, the end face of the stack tends to bulge outward, due to the increased growth of the bipolar plates in the middle of the stack as compared to the bipolar plates at the ends of the stack.

FIG. 1 illustrates a worst-case example of the step-like transition at an end plate-bipolar plate interface of a stack. As can be appreciated, differential growth of the magnitude shown in FIG. 1 will cause the manifold gasket abutting the stack face to be placed under stress. Additional stress is caused at the center of the stack by the above-mentioned bulging. These stresses can lead to gasket failure.

Attempts have been made to reduce this stress by selecting materials for the bipolar plates which exhibit reduced growth. However, this has only partially alleviated the condition.

It is therefore an object of the present invention to overcome the above and other drawbacks of conventional manifold gaskets and, more particularly, to eliminate the stress on the gas seal at the stack-manifold interface during operation of the fuel cell stack.

It is another object of the invention to provide a modified fuel cell stack-manifold gasket that accommodates bipolar plate growth and maintains the gas seal between the stack face and manifold during operation of the stack.

It is another object of the present invention to provide a sealing gasket for use at the fuel cell stack-manifold interface that is reliable, inexpensive, and easy to manufacture and install.

SUMMARY OF THE INVENTION

The above and other objects are achieved by the present invention, which overcomes the disadvantages of conventional fuel cell stack sealing gaskets by providing a compliant manifold gasket for use at the stack-manifold interface. The gasket of the present invention is used in conjunction with a fuel cell stack having a plurality of stack faces, and is placed between the periphery of the face of a fuel cell stack and a manifold. The periphery of the fuel cell stack face includes periphery portions that expand differently during operation of the fuel cell stack. The gasket comprises a member adapted to have different compressibilities over predetermined portions of the member and/or to include a resilient shim embedded in preselected sections of the member whereby the gasket maintains contact with the periphery of the stack face and the manifold. The structure of the gasket of the present invention provides a compliant manifold gasket that compensates for bipolar plate growth in the fuel cell stack and maintains the gas seal at the manifold-stack interface.

A fuel cell stack in accordance with the present invention includes metallic (stainless steel) bipolar plates in at least the end cells of the stack and a compliant gasket between a periphery of the stack face and manifold. The gasket is adapted to have different compressibilities over predetermined portions of the member and/or a resilient shim embedded in preselected sections of the member.

BRIEF DESCRIPTION OF THE DRAWINGS

The above and other features and aspects of the present invention will become more apparent upon reading the following detailed description in conjunction with the accompanying drawings, in which:

FIG. 3A is a view of the compliant gasket of the present invention, showing the gasket abutting a fuel cell stack;

FIG. 4A is a detailed cross sectional view of the gasket and fuel cell stack of FIG. 3A taken through the end plate of the stack;

FIG. 4B is a detailed partial cross sectional view of the gasket of FIG. 3A taken through corresponding aligned ends of the fuel cells of the stack;

FIG. 7 is a perspective view of the gasket of FIG. 3A showing the entire gasket surface which abuts the stack with the top layer of gasket material removed so that the embedded shim is visible;

DETAILED DESCRIPTION

Figure 1:
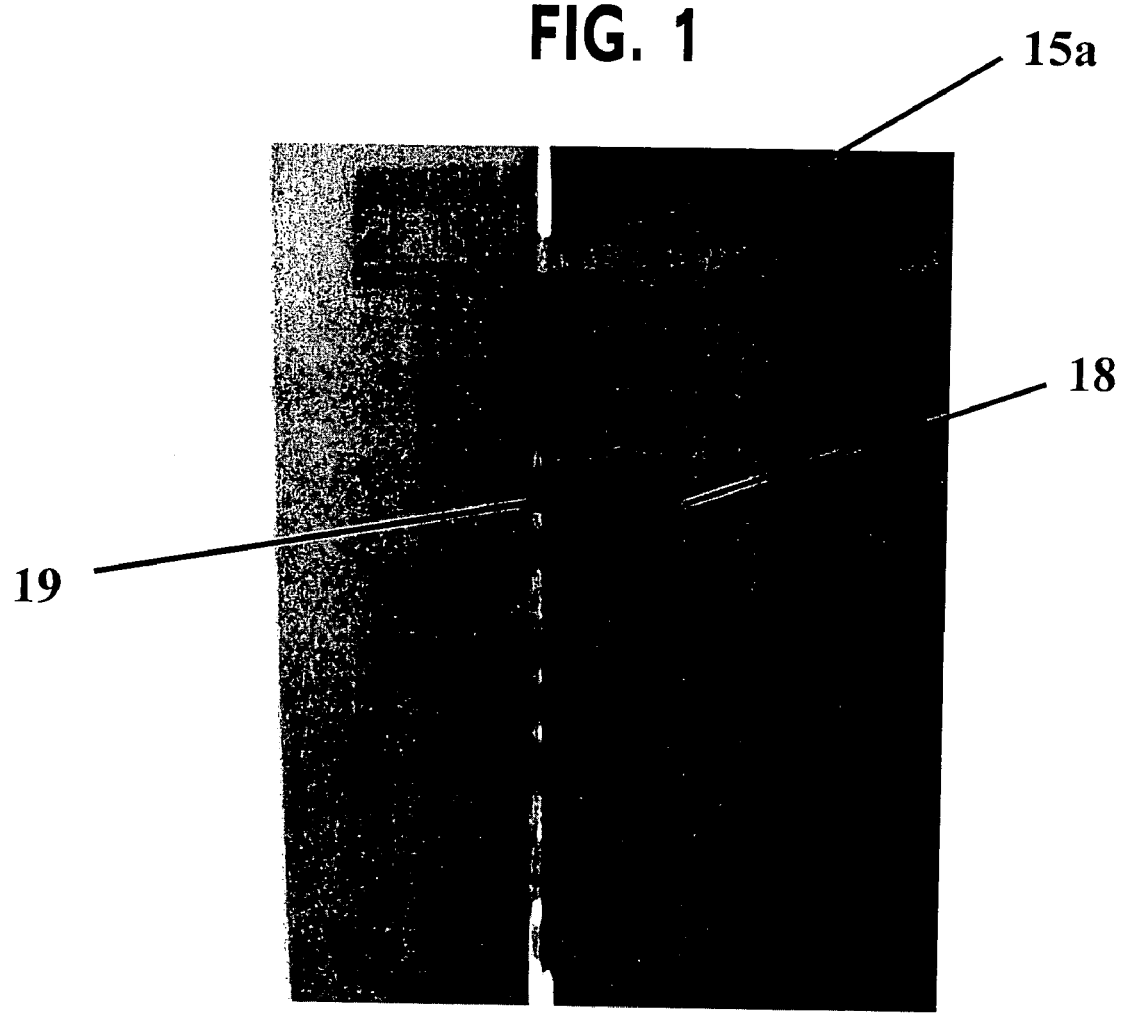
FIG. 1 is a detailed side view of a portion of a fuel cell stack showing the differences in growth of the stack end cell and the stack bipolar plates.
Figure 2:
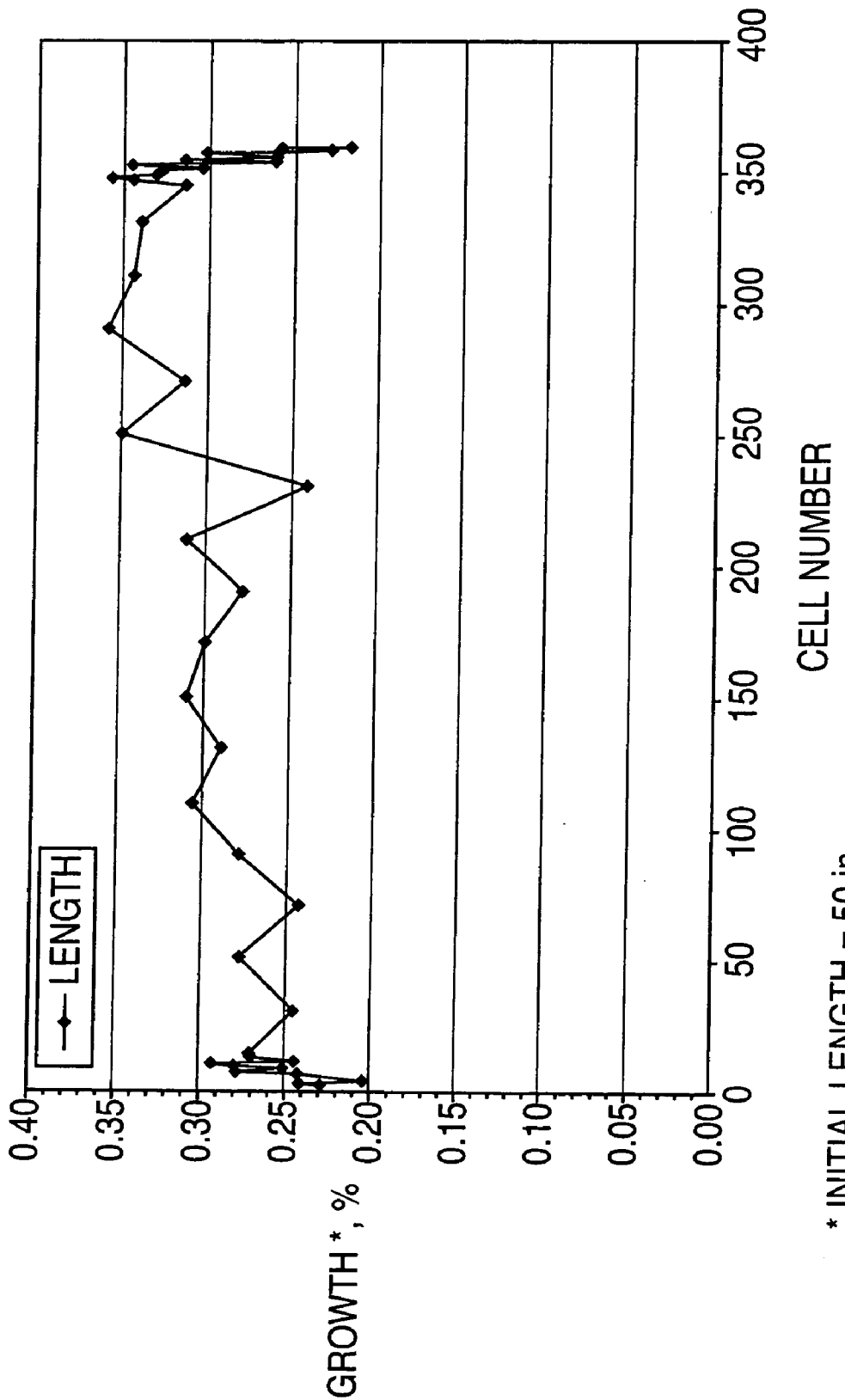
FIG. 2 is a graph showing bipolar plate growth in a representative 400-cell fuel cell stack.
Figure 3B:
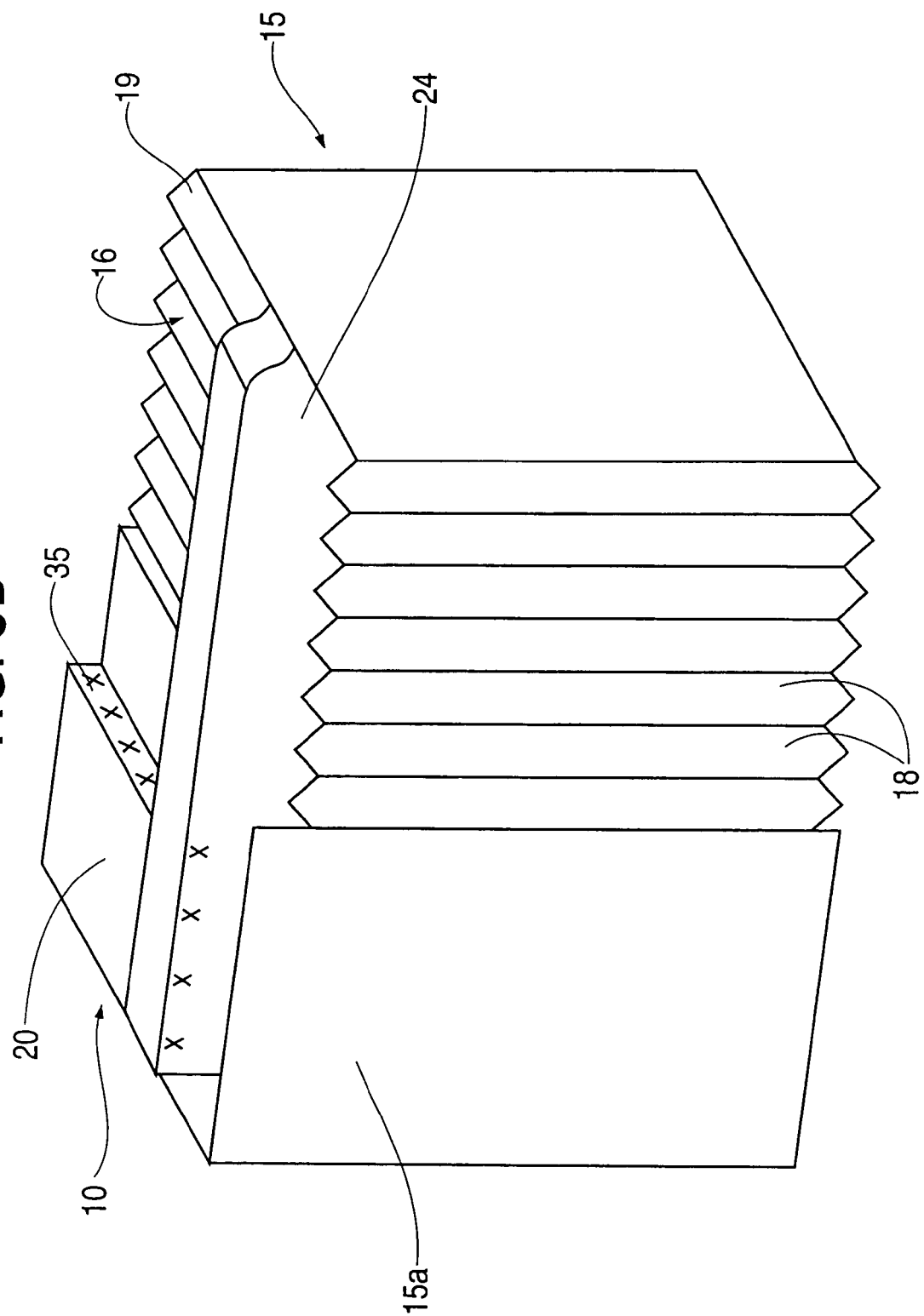
FIG. 3B is a perspective partial view of the gasket and fuel cell stack of FIG. 3A.

The present invention overcomes the above-described disadvantages of fuel cell stack-manifold gaskets in the state of the art by combining, in a compliant gasket to be used at the fuel cell stack-manifold interface, a member having different compressibilities over predetermined portions thereof and/or having a resilient shim which is embedded in preselected sections of the member. FIGS. 3A and 3B show views of a fuel cell stack 15 and an associated compliant gasket 10 in accordance with the present invention. The gasket 10 provides a seal for a manifold which is to be placed in facing relationship with the face 16 of the stack 15 and whose edges are to abut the periphery of the stack face.

The fuel cell stack 15 comprises a plurality of fuel cells 18 disposed in stacked relationship between end plates 15a and 15b. The stack face 16 is defined by end faces of the bipolar plates 19 included in the cells 18 and end faces of the end plates 15a and 15b. As above-mentioned, the gasket 10 abuts periphery portions of the stack face 16.

As shown, the gasket 10 comprises first and second members 20, 21 abutting first and second periphery portions formed by central portions of the end faces of the end plates 15a and 15b. Gasket 10 also comprises third and fourth members 24, 25 abutting third and fourth periphery portions of the stack face. The latter stack face portions are formed by portions of the end faces of opposite ends of the bipolar plates 19 and end portions of the end faces of the end plates 15a and 15b.

In the present illustrative case, each gasket member 20, 21, 24 and 25 is made of layers of a fibrous material such as zirconia felt, e.g., Zircar ZYF 100, alumina felt, or similar fibrous or felt material. The gasket members may also be filled with silica powder or similar nonmetallic powder material. In addition, as will be explained in further detail below, a resilient shim is embedded in selected sections of the gasket members between the fibrous layers and acts as a spring to achieve compliance of the gasket during operation of the fuel cell stack.

As discussed above, the bipolar plates 19 grow with operation of the stack 15 over time. This growth occurs due to carburization and is in a lengthwise direction and a widthwise direction parallel to the plane of the fuel cells in which the bipolar plates 19 are disposed. The amount of growth in each direction depends upon whether the fuel cells are stacked vertically or horizontally between the end plates 15a and 15b to form a vertically or horizontally oriented stack. In any case, regardless of stack orientation, this growth in the bipolar plates is generally greater than that of the end plates 15a and 15b.

Due to the different amounts of growth of the bipolar plates 19 and the end plates 15a and 15b, the periphery portions of the end face 16 expand differently over time during operation of the fuel cell stack 15. The expansion, as previously discussed, results in a step-like transition at the interface of the bipolar plates and the end plates. In addition, the bipolar plates at the center of the stack grow more than those at the ends of the stack resulting in a bulging at the center of the stack. The gasket 10, with the above-described configuration, is specifically adapted to compensate for these effects so as to maintain the seal between the stack face and the manifold placed against the face. In particular, the use of different compressibilities over predetermined portions of the gasket 10 and/or the embedding of a resilient shim in preselected sections of the gasket 10 provides compliance and follow up so as to accommodate increasing strain on the gasket and maintain its sealing effectiveness over long term operation of the stack.

FIGS. 4A and 4B are detailed cross-sectional views through the end plate 15a and along one end of the cells 18, respectively, of the gasket 10 and stack 15 of FIG. 3B. These views show the first member 20 and third member 24 of the gasket 10. These members are similar in configuration to the second and fourth members 21, 25, respectively, of the gasket 10. More particularly, turning to FIG. 4A, first member 20, which abuts the end plate 15a only, includes a plurality of layers 20a, 20b and 20c each of which is made from a compressible material which, as above-stated, in the present case, is preferably a zirconia felt (ZYF 100) or a similar fibrous felt material. To reduce the compressibility of the first member 20 and also reduce gas leakage, each of the layers 20a, 20b, 20c is further filled with a silica powder.

Turning to FIG. 4B, a central portion of the third member 24 lies adjacent the end faces of the bipolar plates 19 at one end of the plates, while the ends of the third member 24 lie adjacent the ends of the end faces of the end plates 15a, 15b. The third member 24 also comprises a plurality of layers 24a, 24b and 24c. Each of these layers, like the layers in the member 20, is also made of a compressible material, which again, in the present case, is a zirconia felt material. Each layer, however, is not filled with silica or other powder, so that the member 24 has a different (greater) compressibility than the member 20.

It should be noted that although three layers are shown for each of the members 20–24, the members can have a different number of layers. Thus, members formed with two layers or more than three layers are also consistent with the invention.

In one example of the gasket 10 of the invention, each of the silica-filled layers of the first and second members 20, 21 had a nominal thickness of approximately 0.080 inches and was compressible to approximately 50% of the original thickness at the beginning of life. On the other hand, each layer of the unfilled third and fourth members 24, 25 also had a nominal thickness of approximately 0.080 inches, but was compressible to greater than 50% of its the original thickness, as discussed further below with respect to FIG. 5. The nominal thickness of each layer can vary depending on factors such as the design of the gasket member 10 and the specific materials used. In addition, other fibrous felt materials may be used for the layers instead of zirconia felt.

Regardless of choice of material, however, in the present illustrative case, the first and second members 20, 21 are completely filled with silica powder and the third and fourth members 24, 25 are unfilled. By this selective filling of the gasket members, the gasket 10 exhibits the above-mentioned different compressibilities to the end faces of the end plates 15a, 15b and the end faces of the bipolar plates 19 so as to help compensate for the difference in growth (greater growth) of the bipolar plates as compared to the end plates.

Particularly, as described above, the silica-filled first and second members 20, 21 have lower compressibility than the unfilled third and fourth members 24, 25. As also described above, and as shown in FIGS. 3A and 3B, the end faces at the ends of the of the end plates 15a, 15b abut the first and second members 20, 21 as well as end areas of the third and fourth members 24, 25 of the gasket 10. During operation of the stack 15, the end plates exhibit small dimensional change and therefore add little or no compressive load to the adjacent gasket members 20, 21 or to adjacent portions of gasket members 24, 25. In contrast, the central portions of the third and fourth members 24, 25 are subjected to a significant compressive load due to the substantial growth of the adjacent end faces of the bipolar plates 19. However, the increased compressibility of the third and fourth members 24, 25, due to the absence of a filling, enables the members to accommodate this substantial growth and compressive load.

Figure 5:
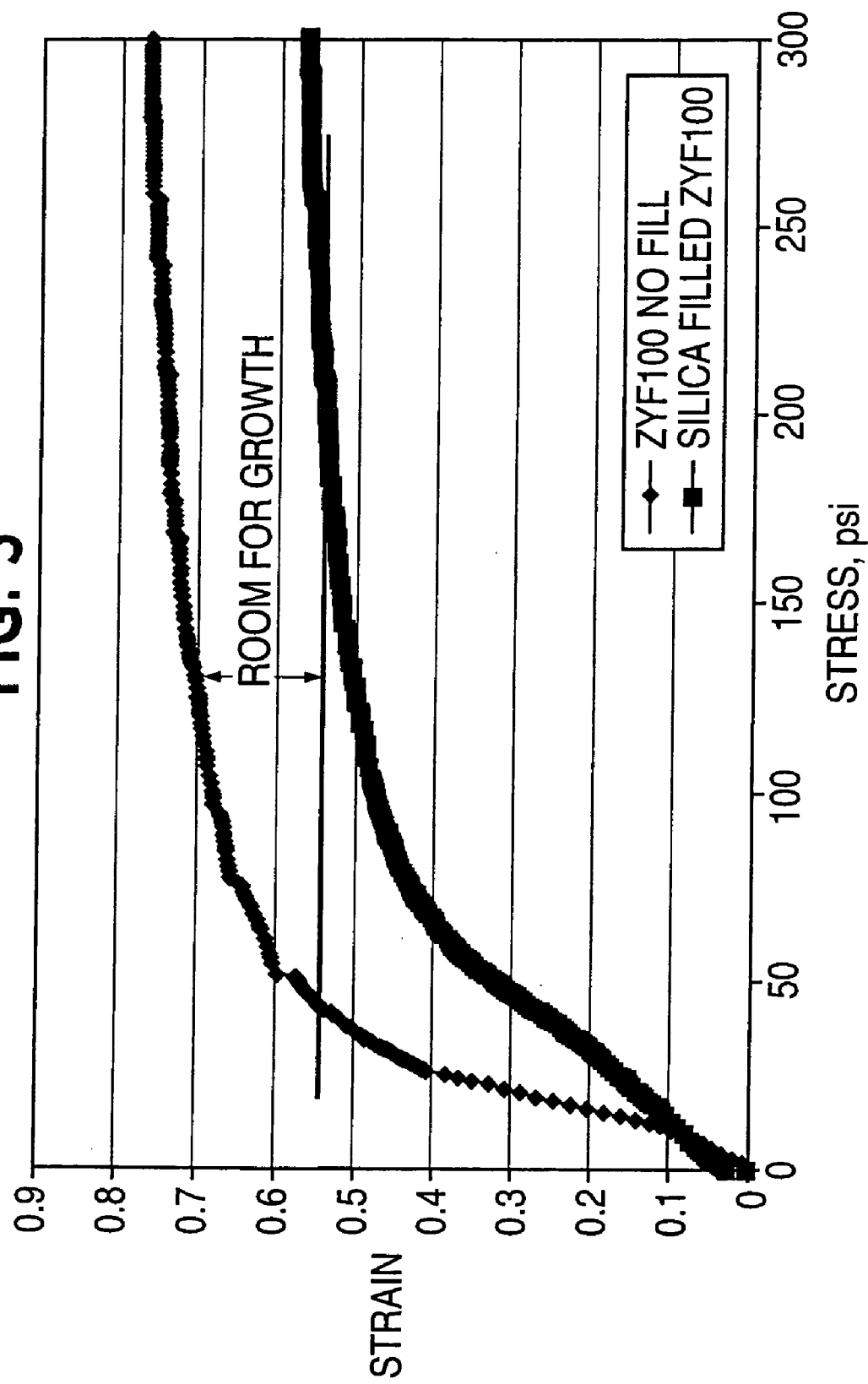
FIG. 5 is a graph depicting the strain occurring in a silica-filled zirconia gasket material and an unfilled zirconia gasket material as a function of stress.

FIG. 5 depicts the relative compressibilities of the silica-filled and unfilled gasket members. As shown in FIG. 5, silica-filled ZYF 100 material can be compressed by approximately 45% of its original thickness under 100 psi. At pressures above 100 psi, however, the filled ZYF 100 exhibits smaller increases in compressibility. In general, the filled ZYF 100 material cannot be compressed beyond 55–58% of its original thickness. In contrast to the silica-filled ZYF 100, the unfilled material shows much greater compressibility or compliance. Particularly, the unfilled ZYF 100 may be compressed by as much as 60% of its original thickness at approximately 50 psi and as much as 70% of its original thickness at 100 psi. This permits the unfilled material to accommodate considerable bipolar plate growth. More particularly, the horizontal line in FIG. 5 represents the average strain on the gasket due to bipolar plate growth, by which the gasket is compressed by about 55% of its original thickness. Thus, as shown in FIG. 5, the use of unfilled ZYF 100 in the gasket members accommodates additional growth of the bipolar plates and thereby increases the compliance of the gasket where needed.

The selective loading of the gasket members with silica powder as described above achieves appreciable follow up of the gasket during operation of the stack, depending on specific gasket loading, materials used and specific gasket design. Specifically, it has been found that by selectively loading gasket members with silica powder or other similar compressible powder material while leaving selected gasket members unfilled, the gasket can accommodate an additional amount (in the range of 24 mils) of bipolar plate growth per side.

In addition to selectively filling the gasket members of the gasket 10 with silica or similar powder, the present invention further contemplates the use of a resilient shim embedded in selected sections of the gasket members to further accommodate stack-manifold stresses resulting from bipolar plate growth. In the present illustrative case, the shim comprises a sheet of superalloy metallic material such as Inconel 718, Waspaloy, or Rene-41 or similar high-strength superalloy material capable of withstanding high-temperature, high-stress conditions.

More particularly, looking back to FIGS. 4A and 4B, a shim 35 is embedded in the first and second members 20, 21 throughout their lengths and in the portions of the third and fourth members 24, 25 abutting the respective faces of the end plates 15a, 15b. Specifically, the shim 35 in each gasket member is disposed between and parallel to two layers of the gasket member such as, for example, between layers 20a and 20b of the first gasket member 20 and between layers 24a and 24b at the end portion of the third gasket member 24, as partially shown in the detailed cross-sectional views of FIGS. 4A and 4B.

Figure 6A:
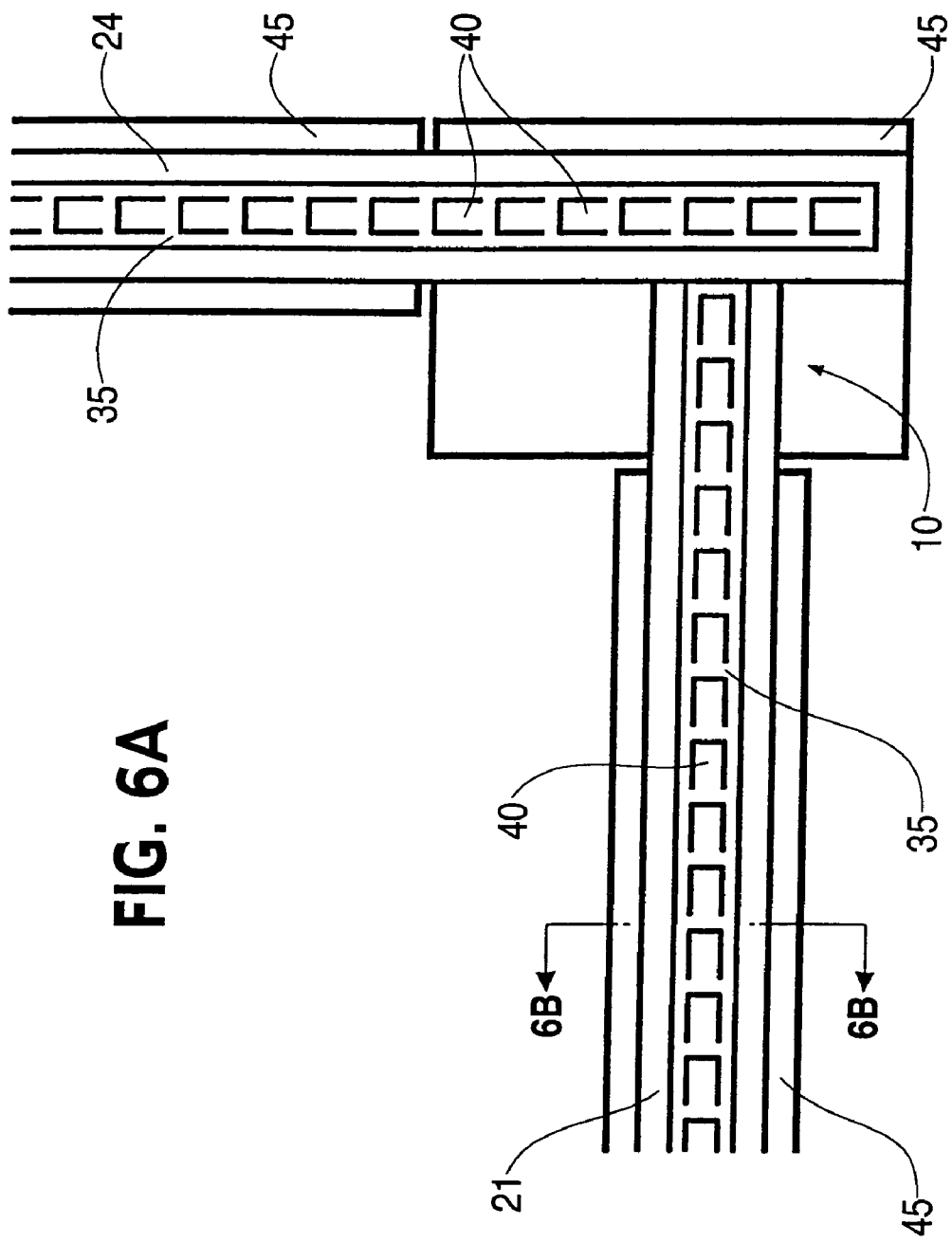
FIG. 6A is a detailed view of a corner portion of the gasket of FIG. 3A showing the gasket face which abuts a face of the fuel cell stack with the top gasket layer removed so that the embedded shim is visible.

FIG. 6A is a detailed view of a corner portion of the gasket 10 and the stack 15 with the top layer of compressible material of the depicted gasket members removed so that the embedded resilient shim 35 in each member is visible. As previously described, each shim 35 extends parallel to the gasket member in which it is embedded. Moreover, as can be seen in FIGS. 4A and 4B and in FIG. 6A, each shim 35 has a generally elongated rectangular body with sections 40 extending outward of the body, defining cantilevers. The sections 40 can be formed by making like-directed U-shaped cuts or punches along the length of the body of the shim 35, with the resultant sections 40 remaining joined to the shim on one side. Each section 40 is raised or angled away from the shim body in the same direction and at approximately the same angle θ, as shown more clearly in the detailed views of FIGS. 4A and 4B. In the case shown, the sections 40 are rectangular, planar sections and the angle θ is in the range of approximately 2 to 50 degrees.

It should be noted that the shape of the portions 40 is not limited to a planar, rectangular shape. Thus, the portions 40 may be shaped differently, i.e., be other than rectangular, and be non-planar, i.e. be bent or curled in some fashion, while still providing structural support and compliance to the gasket in accordance with the invention. Additionally, the angle θ may vary based on the configuration of the sections 40.

With the structure as shown in FIGS. 4A, 4B and 6A, the sections 40 of each shim 35 collectively act as a spring by which the first and second gasket members 20, 21 and the end portions of the gasket members 24, 25 press against end faces the stack end plates 15a, 15b on one side and against the associated manifold on the opposite side. As discussed above, as the bipolar plates 19 grow, they push outward and compress the center portions of the unfilled third and fourth members 24, 25. Eventually, the load on the first and second silica-filled gasket members 20, 21 decreases as the bipolar plates continue to grow. Particularly, beyond the point of maximum compression of the third and fourth gasket members 24, 25, the manifold is pushed away from the first and second members 20, 21. As the load of the manifold on the first and second members 20, 21 decreases, the resilient shims 35 embedded in each of the first and second members 20, 21 and in end portions of the third and fourth members 24, 25 expand, urging apart the layers between which the shim 35 is embedded, thus providing an additional degree of gasket compliance to accommodate the decreased load (e.g., this increased compliance may be in the range of up to approximately 20 mils).

Figure 6B:
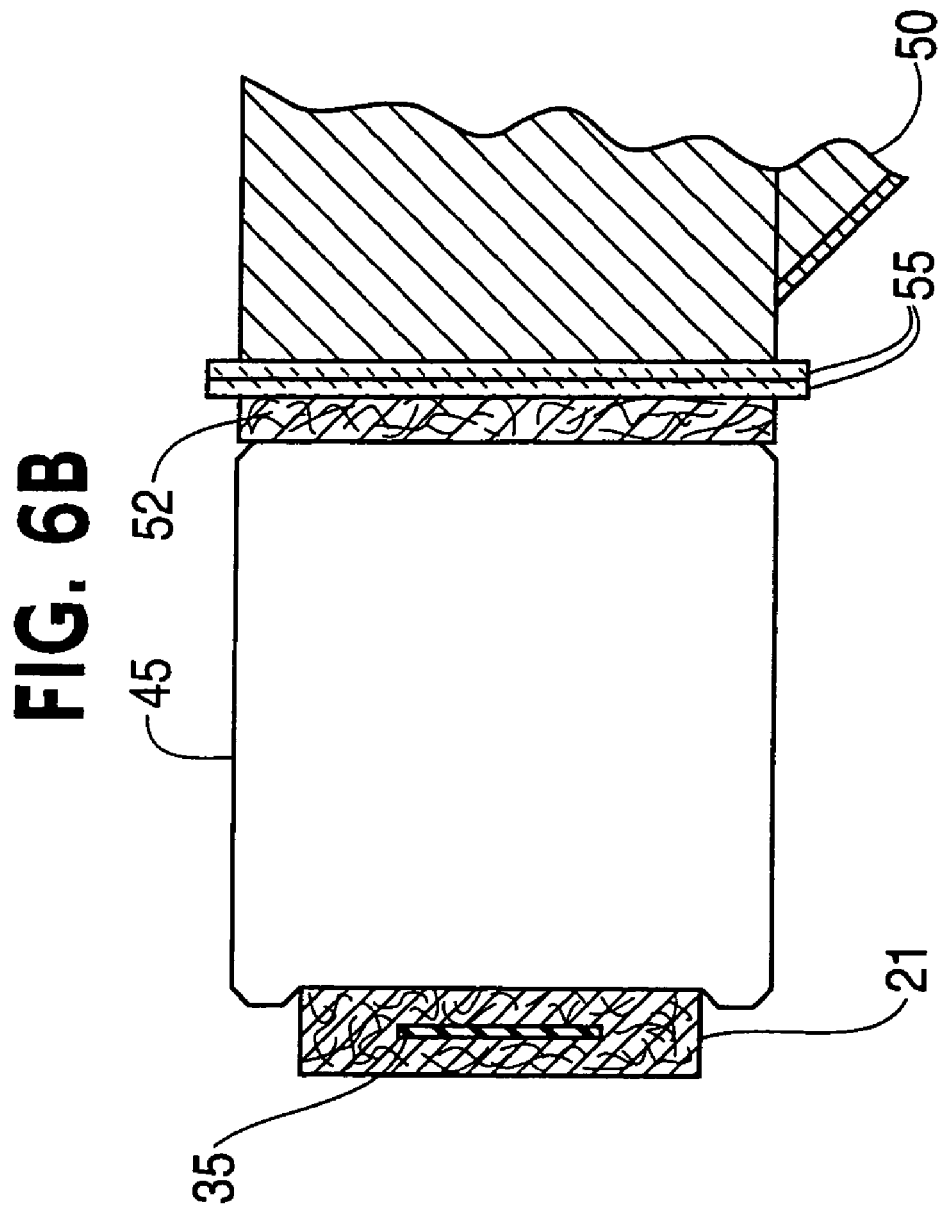
FIG. 6B is a cross-sectional view of the gasket of FIG. 6A, taken along line 6B—6B of FIG. 6A.

As further shown in the detailed views of FIGS. 6A and 6B each of the gasket members is disposed adjacent to a dielectric member 45. More particularly, as can be seen in FIG. 6B, which is a cross-sectional view of the gasket 10 taken along line 6B—6B of FIG. 6A, the gasket member 21 is disposed on dielectric strip 45. The dielectric strip 45 is separated from the manifold 50 by a layer of gasket material 52 and mica 55. In the illustrative embodiment, two layers of mica 55 are used between the dielectric strip 45 and the metal manifold 50 to ensure good electrical separation of the dielectric from the manifold and provide large capacity for voltage isolation.

FIG. 7 is a perspective view showing of the entire surface of the gasket 10 which abuts the stack face. The gasket 10 is shown without a top layer so as to make visible the embedded shim 35 in each of the first and second members 20, 21 and in the end areas of the third and fourth members 24, 25. As can be seen, the central portions of the unfilled third and fourth members 24, 25 contain no shim elements so that such areas may exhibit maximum compressibility in order to accommodate bipolar plate growth, as discussed above.

Figure 8:
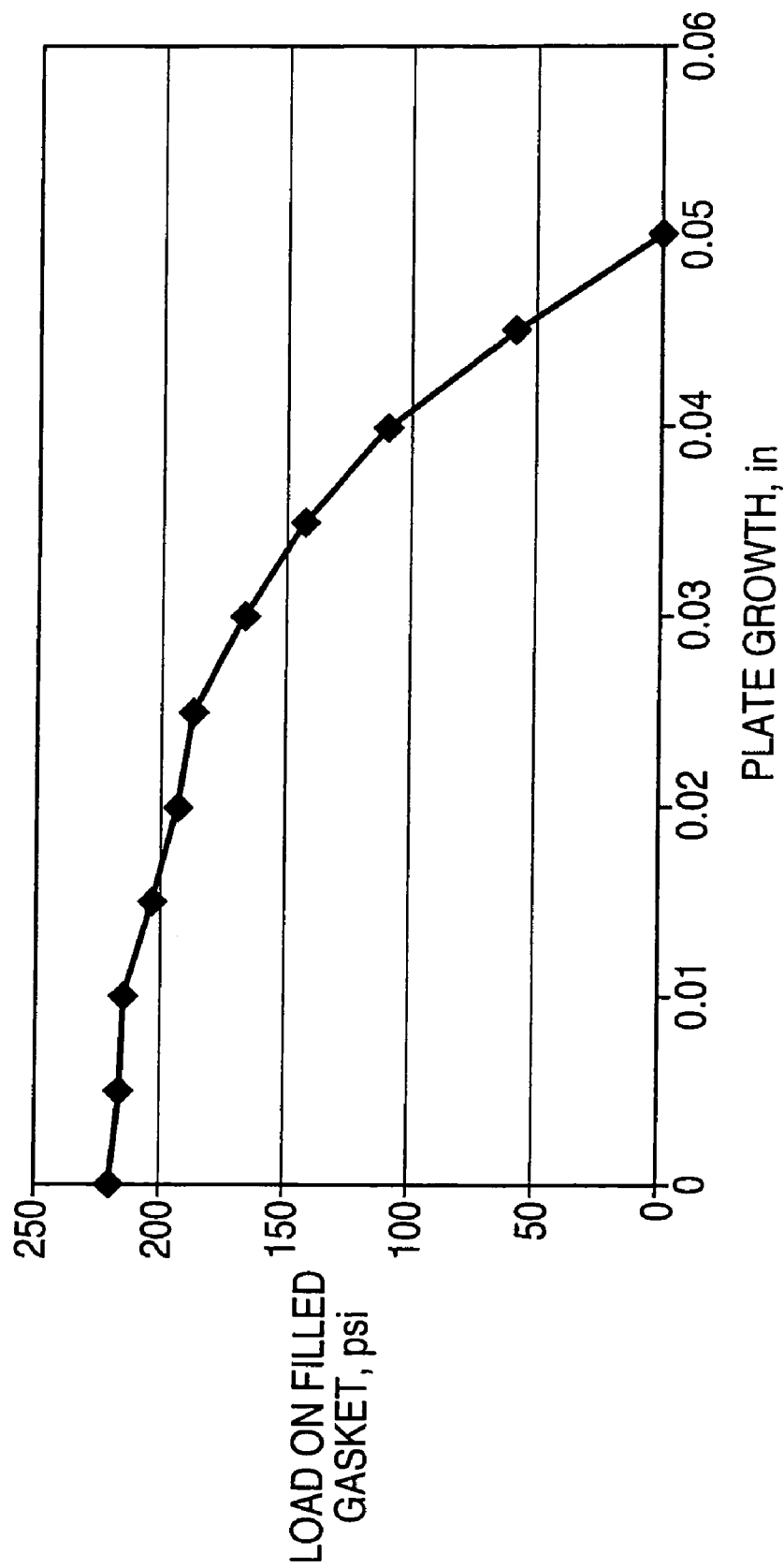
FIG. 8 is a graph depicting the relationship of load on a silica-filled gasket member as a function of bipolar plate growth.

FIG. 8 illustrates in graphical form the relationship of decreasing load or pressure on filled gasket members 20, 21 as a function of bipolar plate growth. The pressure on the filled first and second gasket members 20, 21 is highest at the beginning of fuel cell stack operation, when plate growth is zero or minimal. As the bipolar plates grow and compress the central portions of the unfilled third and fourth gasket members 24, 25 and the manifold is eventually pushed away from the filled members 20, 21 adjacent the end faces of the end plates 15a, 15b, the corresponding load on the filled members 20, 21 gradually decreases. After the bipolar plates have grown by approximately 0.02 inches, load on the filled gasket members 20, 21 drops off, decreasing from approximately 193 psi at 0.02 inches of growth to zero pressure at growth of 0.05 inches or more. As described above with respect to FIGS. 4A and 4B and FIG. 6A, the resilient shim 35 embedded between layers of each of the first and second gasket members 20, 21 and end portions of the third and fourth members 24, 25 causes these members to expand, accommodating any additional growth of the bipolar plates.

Figure 9:
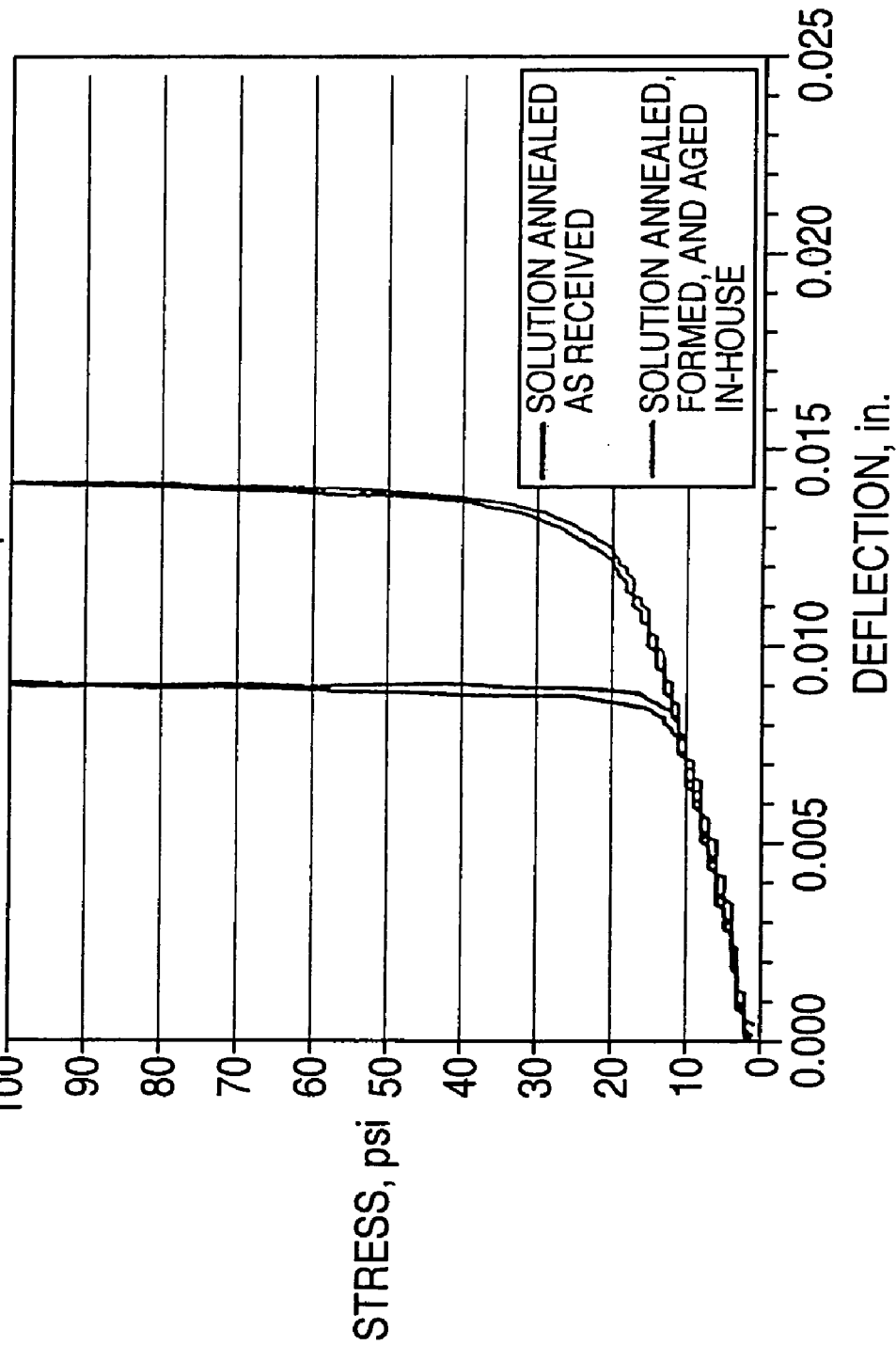
FIG. 9 is a graph depicting the deflection of the resilient shim in the gasket of FIG. 3A under increasing stress.

FIG. 9 graphically depicts the deflection of each resilient shim 35 in the gasket 10 under increasing stress. Up to approximately 20 psi of stress, a shim made from superalloy that has been annealed, formed and aged exhibits as much as approximately 0.013 inches of deflection. Minimal additional deflection of the cantilever shim results from stresses above 20 psi.

Figure 10:
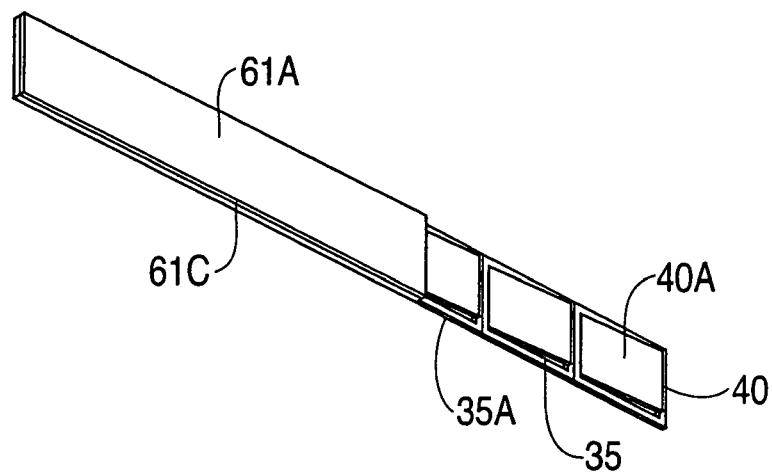
FIGS. 10–12 show various views of a modified resilient shim for use in the gasket of FIG. 3A.
Figure 11:
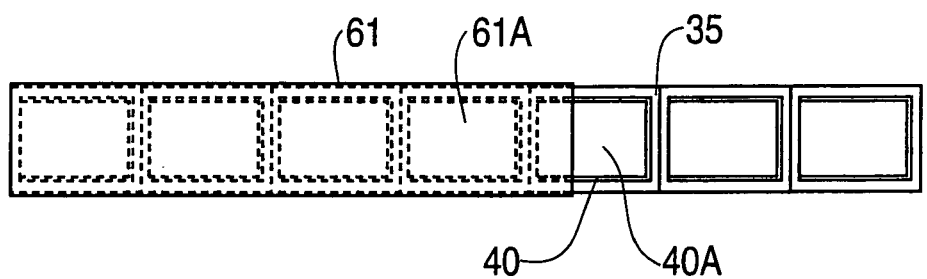
Figure 12:
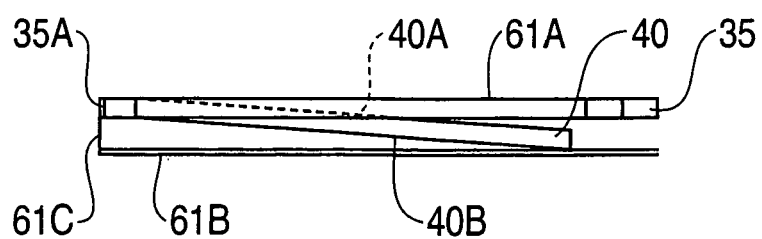

FIGS. 10–12 show various views of a modified form of the resilient shim 35 further adapted to include a metal wrap 61. The wrap 61 has opposing planar layers 61A and 61B which face the opposing surfaces 40A and 40B of the cantilever section 40. A side wall 61C connects the layers 61A and 61B and encloses one edge 35a of the shim 35.

In use, the shim 35 of FIGS. 10–12 is situated in the layers of the gasket 10 with the side wall 61C of the wrap 61 facing inward of the stack, i.e., toward the stack center. The side wall 61C thus helps retard gas flow through the shim 35 and, thus, through the gasket 10. The wrap also inhibits any potential damage to the gasket layers which could occur though interaction of the layers with the cantilever sections 40. The overall compliance of the gasket 10 is thus enhanced.

In all cases it is understood that the above-described apparatus, method and arrangements are merely illustrative of the many possible specific embodiments that represent applications of the present invention. Numerous and varied other arrangements can be readily devised in accordance with the principles of the present invention without departing from the spirit and the scope of the invention.

What is claimed is:

1. A gasket assembly for placement between the periphery of the face of a fuel cell stack and a manifold, said gasket assembly having one or more of: different compressibilities over predetermined portions of the length of said gasket assembly; and a resilient shim disposed within preselected sections of said gasket assembly, and wherein the face of said fuel cell stack has opposing first and second periphery portions formed by portions of the end faces of the end plates of the fuel cell stack and opposing third and fourth periphery portions formed by end portions of the end faces of the bipolar plates of the fuel cells of the fuel cell stack, said third and fourth periphery portions expanding to a greater degree than said first and second periphery portions due to said bipolar plates expanding to a greater degree than said end plates, and wherein said gasket assembly has said different compressibilities over predetermined portions of said gasket assembly and includes a member having said predetermined portions of said gasket assembly, said member having first and second portions adapted to face said first and second periphery portions of said face of said fuel cell stack and third and fourth portions adapted to face said third and fourth periphery portions of said face of said fuel cell stack, said first and second portions of said member being of lower compressibility than said third and fourth portions of said member.

2. A gasket assembly according to claim 1, wherein each of said first, second, third and forth portions of said member are formed by layers of a fibrous material.

3. A gasket assembly according to claim 2, wherein said fibrous material is zirconia felt.

4. A gasket assembly according to claim 2, wherein said layers of said first and second portions of said member are filled with a material so as to cause said first and second portions of said member to be of lower compressibility than said third and fourth portions of said member.

5. A gasket assembly according to claim 4, wherein said first and second portions of said member are compressible up to approximately 30–60% of the original thickness of said first and second portions and said third and forth portions of said member are compressible up to approximately 50–80% of the original thickness of said third and fourth portions.

6. A gasket assembly in accordance with claim 5, wherein the original thickness of each of said first and second portions of said member is 0.208–0.308 inches and the original thickness of each of said third and forth portions of said member is 0.208–0.308 inches.

7. A gasket assembly according to claim 4, wherein said material is silica powder.

8. A gasket assembly according to claim 1, wherein said gasket assembly has said resilient shim, parts of said resilient shim being embedded in said first and second portions of said member.

9. A gasket assembly according to claim 8, wherein said resilient shim includes sections along said resilient shim which provide said resiliency to said resilient shim.

10. A gasket assembly according claim 9, wherein each of said sections of said shim extends outward of the plane of said resilient shim.

11. A gasket assembly according to claim 10, wherein said resilient shim has a flat body and said sections of said resilient shim are cut from said flat body so that each of said sections of said resilient shim is connected to said flat body along one side of that section.

12. A gasket according to claim 11, wherein said sections of said resilient shim are spaced along the length of said flat body and the one side of each of said sections of said resilient shim is on the same side of each of said sections of said resilient shim.

13. A gasket assembly according to claim 11, wherein each of said sections of said resilient shim is disposed at an angle θ from said flat body and provide compliance to said resilience shim.

14. A gasket assembly in accordance with claim 10, further comprising an outer wrap enclosing said resilient shim.

15. A gasket assembly according to claim 14, wherein said outer wrap is closed only on one side of said resilient shim.

16. A gasket assembly according to claim 15, wherein said one side of said resilient shim is the side adapted to face inward of said fuel cell stack.

17. A gasket assembly according to claim 14, wherein said resilient shim and said outer wrap comprise a metallic material.

18. A gasket assembly according to claim 8, wherein the ends of the third and fourth portions of said member are adapted to face said first and second periphery portions of said face of said stack, and parts of said resilient shim are embedded in said ends of said third and fourth portions of said member.

19. A gasket assembly according to claim 18, wherein each of said first, second, third and fourth portions of said member are formed by layers of a fibrous elastic material, and the parts of said resilient shim embedded in said first and second portions of said member are disposed between the layers of fibrous elastic material of said first and second portions and the parts of said shim embedded in said ends of said third and fourth portions of said members are disposed between the layers of fibrous elastic material of said third and fourth portions.

20. A gasket assembly according to claim 19, wherein said layers of said first and second portions of said member are filled with a material so as to cause said first and second portions of said member to be of lower compressibility than said third and fourth portions of said member.

21. A gasket assembly according to claim 20, wherein said first and second portions of said member are compressible up to approximately 30–60% of the original thickness of said first and second portions and said third and fourth portions of said member are compressible up to approximately 50–80% of the original thickness of said third and fourth portions.

22. A gasket assembly in accordance with claim 21, wherein the original thickness of each of said first and second portions of said member is 0.208–0.308 inches and the original thickness of each of said third and fourth portions of said member is 0.208–0.308 inches.

23. A gasket assembly according to claim 20, wherein said material is silica powder.

24. A gasket assembly according to claim 20, wherein said resilient shim includes sections along said resilient shim which provide said resiliency to said shim.

25. A gasket assembly according claim 24, wherein each of said sections of said resilient shim extends outward of the plane of said resilient shim.

26. A gasket assembly according to claim 25, wherein said resilient shim has a flat body and said sections of said resilient shim are cut from said flat body so tat each of said sections of said resilient shim is connected to said flat body along one side of that section.

27. A gasket assembly according to claim 26, wherein said sections of said resilient shim are spaced along the length of said flat body and the one side of each of said sections of said resilient shim is on the same side of each of said sections of said resilient shim.

28. A gasket assembly according to claim 27, wherein each of said sections of said resilient shim is disposed at an angle θ relative to said flat body and provides compliance to said resilient shim.

29. A gasket assembly according to claim 25, further comprising an outer wrap enclosing said resilient shim.

30. A gasket assembly according to claim 29, wherein said wrap is closed only on one side of said resilient shim.

31. A gasket assembly according to claim 30, wherein said one side of said resilient shim is the side adapted to face inward of said fuel cell stack.

32. A gasket assembly according to claim 29, wherein said resilient shim and said outer wrap comprise a metallic material.

33. A gasket assembly for placement between the periphery of the face of a fuel cell stack and a manifold, said gasket assembly having one or more of: different compressibilities over predetermined portions of the length of said gasket assembly; and a resilient shim disposed within preselected sections of said gasket assembly,
  and wherein: said gasket assembly includes a member and said resilient shim is embedded in said member; said resilient shim includes sections along said resilient shim which provide said resiliency to said resilient shim; each of said sections of said resilient shim extends outward of the plane of said resilient shim;
  and said gasket assembly further comprising an outer wrap enclosing said resilient shim.

34. A gasket assembly according to claim 33, wherein said resilient shim has a flat body and said sections of said resilient are cut from said flat body so that each of said sections of said resilient shim is connected to said flat body along one side of that section.

35. A gasket assembly according to claim 34, wherein said sections of said resilient shim is spaced along the length of said flat body and the one side of each of said sections of said resilient shim is on the same side of each of said sections of said resilient shim.

36. A gasket assembly according to claim 35, wherein each said sections of said resilient shim is disposed at an angle θ relative to said flat body and provide compliance to said resilience shim.

37. A gasket assembly according to claim 33, wherein said outer wrap is closed only on one side of said resilient shim.

38. A gasket assembly according to claim 37, wherein said one side of said resilient shim is the side adapted to face inward of said fuel cell stack.

39. A gasket assembly according to claim 33, wherein said resilient shim and said outer wrap comprise a metallic material.

40. A fuel cell stack assembly comprising:
  a fuel cell stack including: end plates at opposite ends of said stark; a plurality of fuel cells stacked one against the other between said end plates; and said fuel cells and said end plates defining at least one face for said fuel cell stack;
  a manifold adjacent said one face of said fuel cell stack; and
  a gasket assembly for placement between the periphery of said face of a fuel cell stack and said manifold, said gasket assembly having one or more of: different compressibilities over predetermined portions of the length of said gasket assembly; and a resilient shim disposed within preselected sections of said gasket assembly.

41. A fuel cell stack assembly according to claim 40, wherein the face of said fuel cell stack has opposing first and second periphery portions formed by portions of the end faces of the end plates of the fuel cell stack and opposing third and fourth periphery portions formed by end portions of the end faces of bipolar plates of the fuel cells of the fuel cell stack, said third and fourth periphery portions expanding to a greater degree than said first and second periphery portions due to said bipolar plates expanding to a greater degree than said end plates, and wherein said gasket assembly has said different compressibilities over predetermined portions of said gasket assembly and includes a member having said predetermined portions of said gasket assembly, said member having first and second portions adapted to face said first and second periphery portions of said face of said fuel cell stack and third and fourth portions adapted to face said third and fourth periphery portions of said face of said fuel cell stack, said first and second portions of said member being of lower compressibility than said third and fourth portions of said member.

42. A fuel cell stack assembly according to claim 41, wherein each of said first second, third and fourth portions of said member are formed by layers of a fibrous elastic material.

43. A fuel cell stack assembly according to claim 42, wherein said fibrous elastic material is zirconia felt.

44. A fuel cell stack assembly according to claim 42, wherein said layers of said first and second portions of said member are filled with a material so as to cause said first and second portions of said member to be of lower compressibility than said third and fourth portions of said member.

45. A fuel cell stack assembly according to claim 44, wherein said material is silica powder.

46. A fuel cell stack assembly according to claim 41, wherein said gasket assembly has said resilient shim, parts of said resilient shim being embedded in said first and second portions of said member.

47. A fuel cell stack assembly according to claim 46, wherein said resilient shim includes sections along said resilient shim which provide said resiliency to said resilient shim.

48. A fuel cell stack assembly according claim 47, wherein each of said sections of said resilient shim extends outward of the plane of said resilient shim.

49. A fuel cell stack assembly in accordance with claim 48, further comprising an outer wrap enclosing said resilient shim.

50. A fuel cell stack assembly according to claim 49, wherein said outer wrap is closed only on one side of said resilient shim.

51. A fuel cell stack assembly according to claim 50, wherein said one side of said resilient shim is the side adapted to thee inward of said fuel cell stack.

52. A fuel cell stack assembly according to claim 46, wherein the ends of the third and fourth portions of said member are adapted to face said first and second periphery portions of said face of said stack, and parts of said resilient shim are embedded in said ends of said third and fourth portions of said member.

53. A fuel cell stack assembly according to claim 52, wherein each of said first, second, third and fourth portions of said member are formed by layers of a fibrous elastic material, and the parts of said resilient shim embedded in said first and second portions of said member are disposed between the layers of fibrous elastic material of said first and second portions and the parts of said resilient shim embedded in said ends of said third and fourth portions of said members are disposed between the layers of fibrous elastic material of said third and fourth portions.

54. A fuel cell stack assembly according to claim 53, wherein said layers of said first and second portions of said member are filled with a material so as to cause said first and second portions of said member to be of lower compressibility than said third and fourth portions of said member.

55. A fuel cell stack assembly according to claim 54, wherein said material is silica powder.

56. A fuel cell stack assembly according to claim 54, wherein said resilient shim includes sections along said resilient shim which provide said resiliency to said resilient shim.

57. A fuel cell stack assembly according claim 54, wherein each of said sections of said resilient shim extends outward of the plane of said resilient shim.

58. A fuel cell stack assembly according to claim 57, further comprising an outer wrap enclosing said resilient shim.

59. A fuel cell stack assembly according to claim 58, wherein said outer wrap is closed only on one side of said resilient shim.

60. A fuel cell stack assembly according to claim 59, wherein said one side of said resilient shim is the side adapted to face inward of said fuel cell stack.

61. A fuel cell stack assembly according to claim 58, wherein said resilient shim and said outer wrap comprise a metallic material.

62. A fuel cell stack assembly in accordance with claim 40, wherein said gasket assembly includes a member and said resilient shim is embedded in said member.

63. A fuel cell stack assembly according to claim 62, wherein said resilient shim includes sections along said resilient shim which provide said resiliency to said resilient shim.

64. A fuel cell stack assembly according to claim 63, wherein each of said sections of said resilient shim extends outward of the plane of said resilient shim.

65. A fuel cell stack assembly according to claim 64, further comprising an outer wrap enclosing said resilient shim.

66. A fuel cell stack assembly according to claim 65, wherein said outer wrap is closed only on one side of said resilient shim.

67. A fuel cell stack assembly according to claim 66, wherein said one side of said resilient shim is the side adapted to face inward of said fuel cell stack.

68. A fuel cell stack assembly according to claim 67, wherein said resilient shim and said outer wrap comprise a metallic material.

* * * * *

UNITED STATES PATENT AND TRADEMARK OFFICE
CERTIFICATE OF CORRECTION

PATENT NO. : 6,964,825 B2  
DATED : November 15, 2005  
INVENTOR(S) : Mohammad Farooque It is certified that error appears in the above-identified patent and that said Letters Patent is hereby corrected as shown below:

<u>Column 1,</u>
Line 2, insert -- STATEMENT AS TO RIGHTS TO INVENTIONS MADE UNDER FEDERALLY SPONSORED RESEARCH AND DEVELOPMENT
This invention was made with Government support under contract DE-FC21-95MC31184 awarded by the Department of Energy. The Government has certain rights in the invention. --.

Signed and Sealed this

Thirtieth Day of May, 2006

JON W. DUDAS
*Director of the United States Patent and Trademark Office*